UNITED STATES PATENT OFFICE.

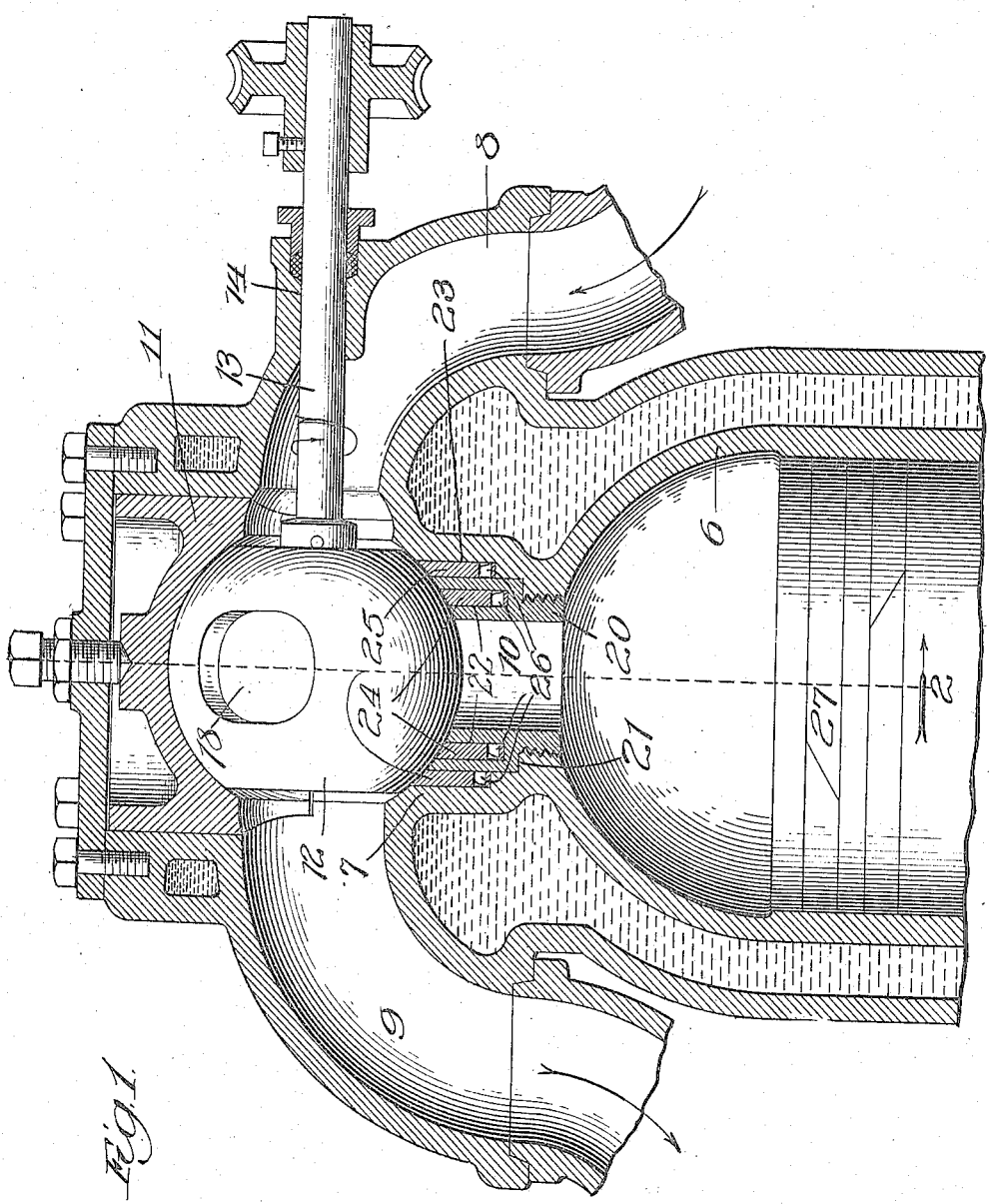

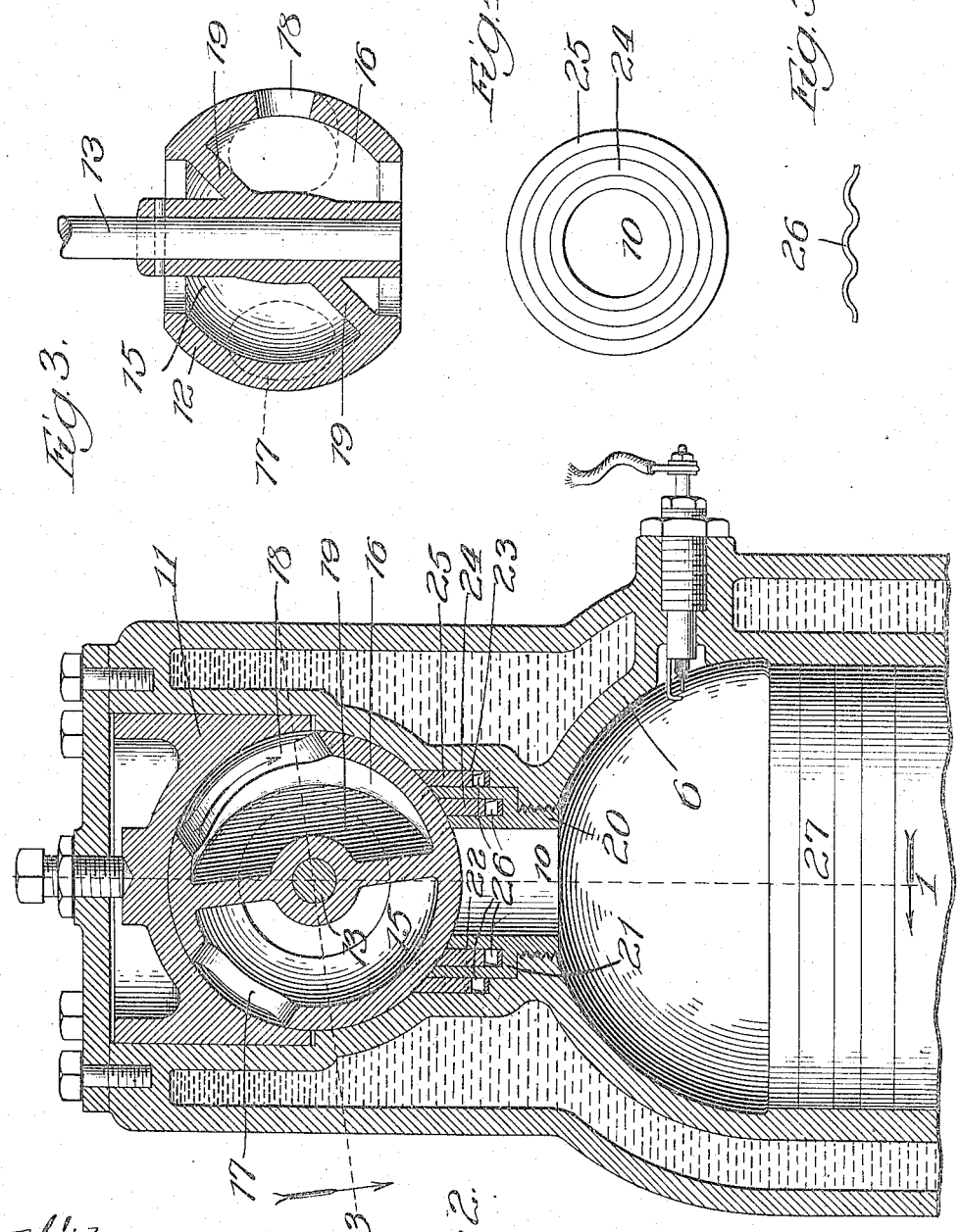

MILFORD G. CHANDLER, OF CHICAGO, ILLINOIS, ASSIGNOR TO CHANDLER ENGINE VALVE COMPANY, OF CHICAGO, ILLINOIS, A CORPORATION OF ILLINOIS.

VALVE DEVICE FOR INTERNAL-COMBUSTION ENGINES.

1,128,757.

Specification of Letters Patent.   Patented Feb. 16, 1915.

Application filed September 30, 1913.   Serial No. 792,644.

*To all whom it may concern:*

Be it known that I, MILFORD G. CHANDLER, a citizen of the United States, residing at Chicago, in the county of Cook and State of Illinois, have invented a new and useful Improvement in Valve Devices for Internal-Combustion Engines, of which the following is a specification.

My invention relates more particularly to improvement in valves of the rotatory or oscillatory type for controlling the inlet and exhaust of gases through a single port in the engine cylinder; and my primary objects are to provide a construction of valve which shall be of simple form, economical of manufacture, and which will be maintained sufficiently cool even when the engine is operating at high speeds, and by which intermixture of the fresh gases with the burnt gases in the valve will be avoided.

Referring to the accompanying drawings—Figure 1 is a view in vertical sectional elevation of the end portion of an internal combustion engine equipped with a rotary valve constructed in accordance with my invention, the section being taken at the line 1 on Fig. 2 and viewed in the direction of the arrow. Fig. 2 is a section taken at the line 2 on Fig 1 and viewed in the direction of the arrow. Fig. 3 is a section taken at the line 3 on Fig. 2 and viewed in the direction of the arrow. Fig. 4 is a plan view of the packing-rings and bushing employed at the cylinder port; and Fig. 5, a broken edge view of one of the similar springs for coöperation with the packing-rings.

I have devised my improvements for use more particularly in connection with a spherical rotary valve coöperating with a packing-member surrounding the port in the engine cylinder, and have therefore illustrated my invention in this connection, though without any intention of limiting it thereby.

The upper portion of a cylinder of an internal combustion engine of the four-cycle type is illustrated at 6, and is formed with a hollow head 7 from which a gas-intake pipe 8, adapted to be connected with a carbureter (not shown), and a spent-gas outlet pipe 9, extend at opposite sides thereof. The interior of the head 7 which forms the casing for the valve, is of general spherical contour and contains a port 10 which opens into the cylinder 6 and forms both the inlet to, and the exhaust from, the cylinder, the upper portion of the head 7 being formed with a removable and replaceable section 11, whereby the valve proper (hereinafter described) may be positioned in the valve-casing 7.

The valve proper of my improved valve device, is represented at 12, and in the form illustrated is a section of a sphere, mounted on a shaft 13 journaled in a bearing 14 provided on the head 7. The valve 12 contains passages 15 and 16 which open through opposite ends, respectively, of the valve and communicate with ports 17 and 18, respectively, in the periphery of the valve 12 and with the inlet and exhaust-pipes 8 and 9, respectively, these ports being so located as to cause them to successively register with the port 10 when the valve is rotated. By preference, the passages 15 and 16 are formed by providing the valve 12 as a hollow body with a diagonally-disposed partition 19 dividing it into the two passages.

By the arrangement above described, gas to be supplied to the cylinder for explosion therein is taken into the valve at one end thereof and discharged from the latter through the port 17 and thence into the cylinder, and the burnt gas from the cylinder is discharged into the port 18 and out through the valve at the other end thereof.

In the construction of valve device illustrated, the valve 12 coöperates with packing-members which surround the port 10. The port 10 in this construction is formed by a bushing 20 screwed into an opening in the upper end of the cylinder 6, this bushing having an enlarged upper end 21 and containing an annular recess 22 which surrounds the port 10, and opens into the interior of the valve-casing 7, the inner surface of the valve-casing 7 being reamed out to form, with the bushing 20, an annular recess 23 surrounding and concentric with the recess 22. Located in the recesses 22 and 23, and movable therein radially of the center of the valve 12, are packing-members 24 and 25, respectively, of any suitable material, preferably metal, in the form of rings, those ends of the members 24 and 25 which are held in contact with the periphery of the valve 12, as hereinafter described, being so shaped, as represented, as to conform to the spherical contour of the periphery of the valve 12. Means are provided for holding the packing-members 24 and 25 in contact with the valve 12 at all times. Any suitable means for this purpose may be provided, those shown in the drawings comprising rings 26 of spring-metal of convoluted form, the rings 26 being confined in the recesses 22 and 23 between the bases of the latter and the inner ends of the packing-members 24 and 25, the parts described being so constructed and arranged that the spring-rings 26 will operate to press the packing-members 24 and 25 against the periphery of the valve 12 with the desired pressure for preventing the escape of fluid pressure around the valve from the port 12 which they surround.

The valve 12 may be operated in any suitable manner to time its rotation, and consequently the communication of the ports 17 and 18 with the port 10, for the introduction of charges into the cylinder 6, and the exhaust of the burnt gases therefrom, with relation to the engine-piston represented at 27, but as mechanism for this purpose in connection with rotary valves in general is commonly used and is well known in the art, a description of the valve-operating means is deemed unnecessary.

The formation of separate passages in the valve 12 with separate openings through the periphery of the valve is of advantage in an internal combustion engine as the fresh gases and burnt gases traverse different passages in the valve, thus avoiding intermixture of these gases in the valve which is very desirable. Furthermore, by so constructing the valve 12, as described, as to cause the area of the passage therein for the fresh, cooling, gas to be introduced into the cylinder, to be relatively great compared with the area of the ports communicating with this passage, a material cooling effect is produced on the valve by the relatively cool gas which tends to prevent excessive heating of the valve with the manifest advantages.

While I have illustrated and described my improvements as embodied in a valve of the strictly rotary type and of spherical form and coöperating with packing-members surrounding the port, I do not wish to be understood as intending to limit my invention to its use in such a valve as it may be incorporated in a valve of either the rotary or oscillatory type, whether spherical or not, and with or without packing-rings surrounding the cylinder port.

By using the word "rotatory" in the following claim, I wish to be understood as intending to claim broadly any valve which moves about an axis and contains my improvements, whether the valve be what is commonly termed a rotary valve or an oscillatory or rocker valve.

What I claim as new and desire to secure by Letters Patent is—

The combination with an internal combustion engine having a port serving for both inlet and exhaust, of a rotatory valve controlling said port and adapted to be operated in timed relation to the piston of the engine and containing passages opening through opposite ends, respectively, of said valve, a partition in said valve dividing it into compartments opening, respectively, into the open ends of said valve, the wall of said valve containing ports opening, respectively, into said compartments and serving as inlet and exhaust passages, a hub extension on said partition, and a stem for operating said valve secured in said hub.

MILFORD G. CHANDLER.

In presence of—
O. C. AVISUS,
L. HEISLAR.